United States Patent
Choi et al.

(10) Patent No.: US 12,401,035 B2
(45) Date of Patent: Aug. 26, 2025

(54) CATHODE ACTIVE MATERIAL FOR LITHIUM SECONDARY BATTERY, LITHIUM SECONDARY BATTERY AND METHOD OF MANUFACTURING THE SAME

(71) Applicant: SK INNOVATION CO., LTD., Seoul (KR)

(72) Inventors: Ji Hoon Choi, Daejeon (KR); Sang Bok Kim, Daejeon (KR); Jik Soo Kim, Daejeon (KR); Hee Jun Kweon, Daejeon (KR); Sung Soon Park, Daejeon (KR)

(73) Assignee: SK ON CO., LTD., Seoul (KR)

( * ) Notice: Subject to any disclaimer, the term of this patent is extended or adjusted under 35 U.S.C. 154(b) by 254 days.

(21) Appl. No.: 17/224,760

(22) Filed: Apr. 7, 2021

(65) Prior Publication Data

US 2021/0399302 A1 Dec. 23, 2021

(30) Foreign Application Priority Data

Jun. 18, 2020 (KR) .................. 10-2020-0074371

(51) Int. Cl.
*H01M 4/58* (2010.01)
*H01M 4/04* (2006.01)
(Continued)

(52) U.S. Cl.
CPC ....... *H01M 4/5825* (2013.01); *H01M 4/0416* (2013.01); *H01M 4/505* (2013.01); *H01M 4/525* (2013.01); *H01M 10/0525* (2013.01)

(58) Field of Classification Search
CPC .. H01M 4/5825; H01M 4/0416; H01M 4/505; H01M 4/525; H01M 10/0525
See application file for complete search history.

(56) References Cited

U.S. PATENT DOCUMENTS

2012/0258362 A1* 10/2012 Mah ............... H01M 4/387
429/223
2013/0089786 A1* 4/2013 Jeong ............... H01M 4/48
429/223
(Continued)

FOREIGN PATENT DOCUMENTS

CN 108091830 * 5/2018 ............. H01M 4/36
CN 108091830 A 5/2018
(Continued)

OTHER PUBLICATIONS

Extended European Search Report issued by the European Patent Office on Oct. 14, 2021.
(Continued)

*Primary Examiner* — Matthew T Martin
*Assistant Examiner* — Taylor Harrison Krone
(74) *Attorney, Agent, or Firm* — IP & T GROUP LLP

(57) ABSTRACT

A cathode active material for a lithium secondary battery of embodiments of the present invention includes a lithium composite oxide, a first coating part formed on a surface of the lithium composite oxide and containing aluminum, and a second coating part formed on the first coating part and containing boron. Thereby, stability and electrical characteristics of the secondary battery may be improved.

13 Claims, 11 Drawing Sheets

(51) Int. Cl.
*H01M 4/505* (2010.01)
*H01M 4/525* (2010.01)
*H01M 10/0525* (2010.01)

(56) References Cited

U.S. PATENT DOCUMENTS

| | | | | |
|---|---|---|---|---|
| 2016/0254572 A1* | 9/2016 | Yu | ............ | H01M 4/661 |
| | | | | 429/126 |
| 2018/0261832 A1* | 9/2018 | Nho | ............ | H01M 4/628 |
| 2019/0140264 A1 | 5/2019 | Hong | | |
| 2020/0028168 A1* | 1/2020 | Ju | ............ | H01M 4/505 |
| 2021/0151754 A1* | 5/2021 | Baek | ............ | H01M 4/525 |
| 2021/0280856 A1* | 9/2021 | Noh | ............ | C01G 53/50 |
| 2021/0376309 A1* | 12/2021 | Son | ............ | H01M 4/134 |

FOREIGN PATENT DOCUMENTS

| | | | |
|---|---|---|---|
| CN | 108878795 A | 11/2018 | |
| CN | 108987681 A | 12/2018 | |
| CN | 110148712 A | 8/2019 | |
| CN | 110534717 A | 12/2019 | |
| JP | 2015-528181 A | 9/2015 | |
| KR | 10-2017-0093085 A | 8/2017 | |
| KR | 10-2017-0103699 A | 9/2017 | |
| KR | 10-1841114 B1 | 3/2018 | |
| KR | 10-2018-0090211 A | 8/2018 | |
| KR | 10-1964716 B1 | 4/2019 | |
| KR | 10-2019-0051862 A | 5/2019 | |
| KR | 10-2019-0051863 A | 5/2019 | |
| KR | 10-2020-0001458 A | 1/2020 | |

OTHER PUBLICATIONS

Office Action issued by the Chinese Patent Office on Nov. 3, 2021.

* cited by examiner

CATHODE ACTIVE MATERIAL FOR LITHIUM SECONDARY BATTERY, LITHIUM SECONDARY BATTERY AND METHOD OF MANUFACTURING THE SAME

CROSS-REFERENCE TO RELATED APPLICATION

This application claims priority to Korean Patent Applications No. 10-2020-0074371 filed on Jun. 18, 2020 in the Korean Intellectual Property Office, the entire disclosure of which is incorporated by reference herein.

BACKGROUND OF THE INVENTION

1. Field of the Invention

The present invention relates to a cathode active material for a lithium secondary battery, a lithium secondary battery, and a method of manufacturing the same, and more specifically, to a lithium composite oxide-based cathode active material for a lithium secondary battery, a lithium secondary battery, and a method of manufacturing the same.

2. Description of the Related Art

A secondary battery is a battery which may be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, and a nickel-hydrogen battery. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane (separator); and an electrolyte in which the electrode assembly is impregnated. The lithium secondary battery may further include, for example, a pouch-shaped outer case in which the electrode assembly and the electrolyte are housed.

In the lithium secondary battery, a lithium composite oxide is used as a cathode active material, and it is preferable to have a high capacity, a high output, and high life-span characteristics. Accordingly, there is a need to maintain a chemical stability even when the lithium composite oxide is repeatedly charged and discharged.

However, when the lithium composite oxide is exposed to the atmosphere or comes in contact with the electrolyte, by-products of lithium or nickel may be generated due to a side reaction on surfaces of lithium composite oxide particles. In this case, the life-span and operational stability of the lithium secondary battery may be deteriorated.

In particular, in a case of lithium composite oxide with a high nickel content, a large amount of lithium impurities (such as LiOH, $Li_2CO_3$, etc.) may be formed on a surface, thereby causing a decrease in battery performance. When washing the lithium impurities with water, a specific surface area of the cathode active material is increased, such that side reactions with an electrolyte are activated, and thereby causing a deterioration in stability of the surface structure.

For example, Korean Patent Laid-Open Publication No. 10-2017-0093085 discloses a cathode active material including a transition metal compound and an ion adsorbing binder, but it is not possible to sufficiently implement the stability.

PRIOR ART DOCUMENT

Patent Document

Korean Patent Laid-Open Publication No. 10-2017-0093085

SUMMARY OF THE INVENTION

It is an object of the present invention to provide a cathode active material for a lithium secondary battery having excellent stability and electrical properties.

In addition, another object of the present invention is to provide a lithium secondary battery having excellent stability and electrical properties.

Further, another object of the present invention is to provide a method of manufacturing a cathode active material for a lithium secondary battery having excellent stability and electrical properties.

To achieve the above-described objects, according to an aspect of the present invention, there is provided a cathode active material for a lithium secondary battery including: a lithium composite oxide; a first coating part formed on a surface of the lithium composite oxide and containing aluminum; and a second coating part formed on the first coating part and containing boron.

According to exemplary embodiments, the first coating part may have a deviation in an aluminum content of less than 20% in an entire region on the surface thereof.

According to exemplary embodiments, the aluminum content may be measured by an intensity of an aluminum peak in an energy-dispersive X-ray spectroscopy (EDS) analysis spectrum, and the deviation may be defined as a percentage of a difference between maximum intensities or minimum intensities based on an average intensity in the aluminum peak.

According to exemplary embodiments, an amount of aluminum eluted when dissolving the cathode active material for 5% of the time taken to completely dissolve the cathode active material from the surface may be 50% by weight or more, based on an amount of aluminum eluted when the cathode active material is completely dissolved from the surface.

According to exemplary embodiments, the first coating part may contain an excess amount of aluminum compared to boron, and the second coating part may contain an excess amount of boron compared to aluminum.

According to exemplary embodiments, the cathode active material may further include an intermediate part containing both aluminum and boron between the first coating part and the second coating part.

According to exemplary embodiments, in the intermediate part, at least one fragmented ion of $LiAlB^+$, $LiAlBOH_4^+$, $Li_4AlB^+$ and $Li_3AlB_3O^+$ may be detected upon time-of-flight secondary ion mass spectrometry (TOF-SIMS) analysis.

According to exemplary embodiments, the intermediate part may have a tendency that a content of aluminum is decreased and a content of boron is increased from the first coating part side to the second coating part side.

According to exemplary embodiments, the first coating part may include an amorphous aluminum-containing oxide.

According to exemplary embodiments, the first coating part may include at least one of amorphous $Al_2O_3$, lithium-aluminum oxide, AlOOH, and $Al(OH)_3$.

According to exemplary embodiments, the second coating part may include an amorphous boron-containing oxide.

According to exemplary embodiments, the second coating part may include at least one of amorphous lithium-boron oxide, LiBO, $Li_2BO_2$, $Li_2B_4O_7$ and $Li_4BO_3$.

According to exemplary embodiments, the lithium composite oxide may contain nickel, and a molar fraction of nickel in the lithium composite oxide among the elements except for lithium and oxygen may be 0.7 or more.

According to exemplary embodiments, the lithium composite oxide may be represented by Formula 1 below:

   [Formula 1]

(In Formula 1, M may be at least one selected from the group consisting of Al, Ti, W, B, F, P, Mg, Mn, Co, V, Cu, Zr, Nb, Mo, Sr, and S, and $\alpha$, $\beta$, y, and z may be in a range of $0.7 \le \alpha \le 1.1$, $-0.1 \le \beta \le 0.5$, $0.7 \le y \le 0.95$, and $0.95 < y+z \le 1.1$, respectively).

According to exemplary embodiments, an aluminum content of the first coating part may be 500 to 2,000 ppm based on a total weight of the cathode active material.

According to exemplary embodiments, a boron content of the second coating part may be 200 to 1,200 ppm based on a total weight of the cathode active material.

According to another aspect of the present invention, there is provided a method of manufacturing a cathode active material for a lithium secondary battery including: forming a preliminary cathode active material including an aluminum-containing coating part by wet coating a lithium composite oxide with an aluminum source; and forming a boron-containing coating part on the aluminum-containing coating part by dry reacting the preliminary cathode active material with a boron source.

According to exemplary embodiments, the lithium composite oxide may be represented by Formula 1 below:

   [Formula 1]

(In Formula 1, M may be at least one selected from the group consisting of Al, Ti, W, B, F, P, Mg, Mn, Co, V, Cu, Zr, Nb, Mo, Sr, and S, and $\alpha$, $\beta$, y, and z may be in a range of $0.7 \le \alpha \le 1.1$, $-0.1 \le \beta \le 0.5$, $0.7 \le y \le 0.95$, and $0.95 < y+z \le 1.1$, respectively).

According to exemplary embodiments, the wet coating may include mixing the lithium composite oxide with an aluminum source solution in which a water-soluble aluminum source is dissolved, and then drying the same.

According to exemplary embodiments, the aluminum source may include at least one of $Al_2(SO_4)_3$, $LiAlO_2$ and $NaAlO_2$.

According to exemplary embodiments, the drying may be performed at 110 to 300° C.

According to exemplary embodiments, the boron source may include at least one of $HBO_2$, $H_3BO_3$ and $H_2B_4O_7$.

According to exemplary embodiments, the dry reaction may be performed at a temperature of 250 to 400° C.

According to another aspect of the present invention, there is provided a lithium secondary battery including: an electrode cell which includes a cathode including the above cathode active material for a lithium secondary battery, an anode, and a separation membrane interposed between the cathode and the anode; a case configured to house the electrode cell; and an electrolyte in which the electrode cell is impregnated in the case.

The cathode active material for a lithium secondary battery according to exemplary embodiments includes the first coating part containing aluminum and the second coating part containing boron, which are sequentially formed, and the aluminum is distributed in a uniform concentration throughout the surface of the first coating part. Due to aluminum having the fixed oxidation number, a phase change in the surface structure of the cathode active material may be suppressed. In addition, aluminum reacts with fluorine ions in the electrolyte to naturally form an aluminum fluoride ($AlF_3$) coating part (self-passivation layer) on a surface of the cathode material. In this case, a surface structure of the cathode active material is highly stabilized, such that side reactions may be prevented.

In addition, the surface of the cathode active material may be smoothly coated with boron to reduce a specific surface area thereof. In this case, a reaction area between the cathode material and the electrolyte may be reduced to suppress side reactions with the electrolyte.

Accordingly, life-span and high temperature stabilities of the cathode active material may be improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
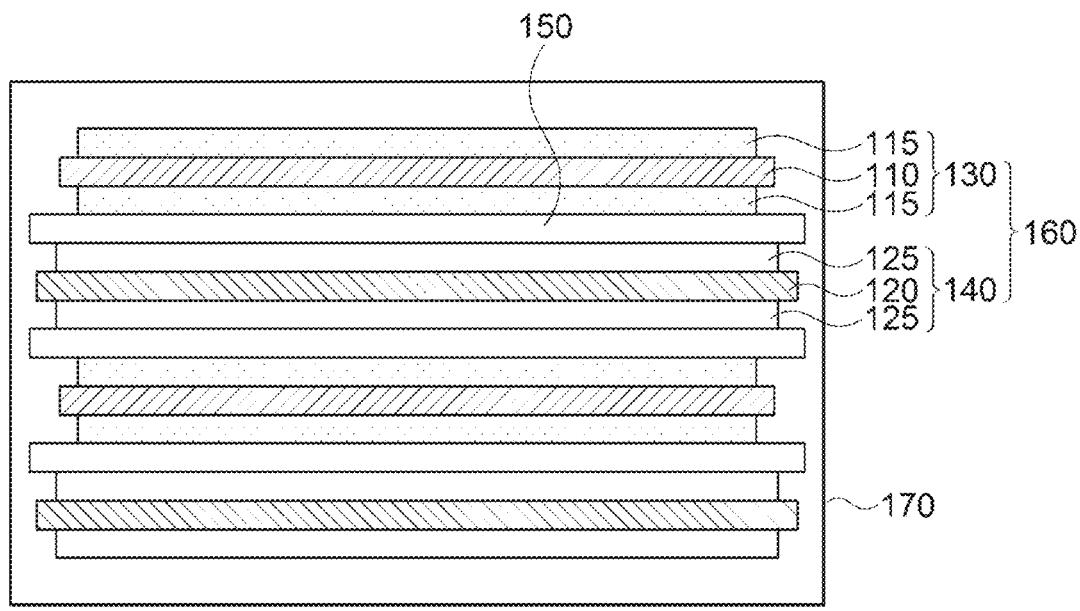
FIG. 1 is a schematic cross-sectional view illustrating a lithium secondary battery according to exemplary embodiments.

Embodiments of the present invention provide a cathode active material for a lithium secondary battery including a first coating part containing aluminum and a second coating part containing boron, which are sequentially formed on a surface of a lithium composite oxide, a lithium secondary battery including the cathode active material, and a method of manufacturing the same. Thereby, stability and electrical characteristics of the secondary battery may be improved.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

FIG. 1 is a schematic cross-sectional view illustrating a lithium secondary battery according to exemplary embodiments.

Referring to FIG. 1, the lithium secondary battery of the present invention may include a cathode 130, an anode 140, and a separation membrane 150 interposed between the cathode and the anode.

The cathode 130 may include a cathode current collector 110, and a cathode active material layer 115 formed by applying a cathode active material to the cathode current collector 110.

Figure 2:
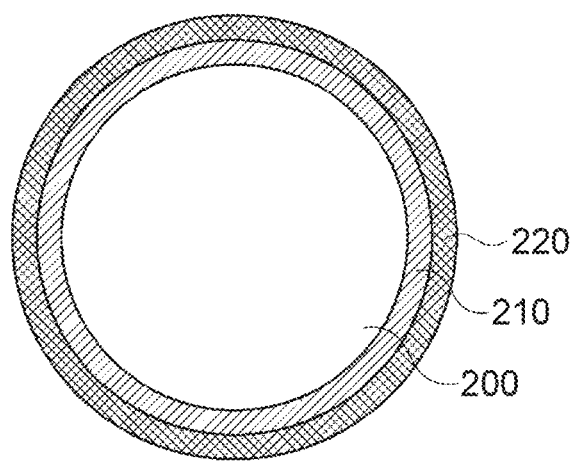
FIGS. 2 and 3 are schematic cross-sectional views of cathode active materials for a lithium secondary battery according to exemplary embodiments.

FIG. 2 is a schematic cross-sectional view of a cathode active material for a lithium secondary battery according to exemplary embodiments.

Referring to FIG. 2, a cathode active material 20 for a lithium secondary battery (hereinafter, also briefly referred to as a cathode active material) may include a lithium composite oxide 200, a first coating part 210, and a second coating part 220.

The lithium composite oxide 200 may be an oxide including other elements such as lithium and a transition metal.

In exemplary embodiments, the lithium composite oxide 200 may include nickel. Nickel may be included in an excess amount among elements except for lithium and oxygen in the lithium composite oxide 200.

The term 'excess amount' as used herein may mean the largest molar fraction or content.

Nickel may be provided as a metal associated with a capacity of the lithium secondary battery. In exemplary embodiments, nickel is included in an excess amount among the elements except for lithium and oxygen, such that the capacity of the secondary battery may be significantly improved.

In exemplary embodiments, the molar fraction of nickel among the elements except for lithium and oxygen in the lithium composite oxide 200 may be 0.7 or more.

In exemplary embodiments, the lithium composite oxide 200 may be represented by Formula 1 below.

$$Li_\alpha Ni_y M_z O_{2-\beta}$$ [Formula 1]

In Formula 1, M may be at least one selected from the group consisting of Al, Ti, W, B, F, P, Mg, Mn, Co, V, Cu, Zr, Nb, Mo, Sr, and S, and $\alpha$, $\beta$, y, and z may be in a range of $0.7 \leq \alpha \leq 1.1$, $-0.1 \leq \beta \leq 0.5$, $0.7 \leq y \leq 0.95$, and $0.95 < y+z \leq 1.1$, respectively.

For example, the higher the content of nickel, the better the capacity and output of the lithium secondary battery. However, if the content of nickel is excessively increased, the life-span of the lithium secondary battery may be reduced, and it may be disadvantageous in terms of mechanical and electrical stabilities. For example, when the content of nickel is excessively increased, faults such as an ignition, short-circuit, etc. may not be sufficiently suppressed upon occurring a penetration caused by an external object. Thus, according to exemplary embodiments, manganese (Mn) may be distributed along therewith as a whole to compensate for chemical and mechanical instabilities caused by nickel.

Manganese (Mn) may be provided as metal associated with the mechanical and electrical stabilities of the lithium secondary battery. For example, it is possible to suppress or reduce a fault such as an ignition, short-circuit, etc. which occurs when the cathode is penetrated by an external object caused by manganese, and thereby increasing the life-span of the lithium secondary battery. Further, cobalt (Co) may be metal associated with a conductivity or resistance of the lithium secondary battery.

When a lower limit of the nickel molar fraction is less than 0.7, the capacity and output may be excessively deteriorated. When an upper limit of the nickel molar fraction exceeds 0.95, a reduction in life-span and mechanical instability may be caused.

According to some embodiments, in the above Formula 1, $M_z$ may be $Co_a Mn_b M'_c$, M' may be at least one element selected from the group consisting of Ti, Zr, Al and B, and a, b, c, and y may be in a range of $0.05 \leq a \leq 0.2$, $0.03 \leq b \leq 0.2$, and $0.95 < y+a+b+c \leq 1.1$, respectively. In this case, the compound represented by Formula 1 is an NCM active material having nickel, cobalt and manganese as a major component, and may exhibit balanced characteristics in terms of the output, capacity, life-span and stability.

Preferably, in the above Formula 1, a, b, c, and y may be controlled so as to be in a range of $0.8 \leq y \leq 0.88$, $0.09 \leq a \leq 0.1$, $0.03 \leq b \leq 0.1$, respectively. In this case, the capacity may be improved while maintaining the stability of the secondary battery.

In some embodiments, the lithium composite oxide 200 may have a secondary particle structure formed by agglomeration of primary particles (e.g., crystals of the compound represented by Formula 1). The particles of lithium composite oxide 200 may have an average particle diameter ($D_{50}$) of about 6 to about 25 μm, and preferably about 10 to 16 μm.

In some embodiments, the lithium composite oxide 200 may have a monolithic particle structure.

For example, the nickel component exposed on the surface of the lithium composite oxide may react with air or moisture, then decomposed into lithium hydroxide, lithium carbonate, nickel oxide, and the like, thus to generate by-products. In addition, nickel ions exposed on the surface react with the electrolyte to cause a phase transition in a surface layer portion of the particles, and modify the crystal structure.

The first coating part 210 may be formed on the surface of the lithium composite oxide 200. In exemplary embodiments, the first coating part 210 may at least partially cover the surface of the lithium composite oxide 200.

For example, the first coating part 210 may be provided as an entire coating for entirely covering the surface of the lithium composite oxide 200 or a partial coating for partly covering the lithium composite oxide 200. In some embodiments, a plurality of the partial coatings may be spaced apart from each other on the surface of the lithium composite oxide 200 to be disposed in a form of an island.

In exemplary embodiments, a distribution of the aluminum component contained in the first coating part 210 may be uniform as a whole. For example, a deviation in the aluminum content in the entire region on a surface of the first coating part 210 may be less than 20%.

The deviation in the aluminum content may be defined as a percentage of a difference between the highest aluminum content and the lowest aluminum content at a specific point located within a predetermined region based on an average aluminum content of the predetermined region where the cathode active material is located.

In this case, the entire surface of the lithium composite oxide 200 may be uniformly protected by the first coating part 210.

The first coating part 210 may contain aluminum (Al). For example, the first coating part 210 may include an aluminum-containing compound. The aluminum-containing compound may include an aluminum-containing oxide or an aluminum-containing hydroxide.

For example, Al has an oxidation number of +3, and may have an ionic radius similar to that of Ni, Co, and Mn. Therefore, Al may be easily substituted with trivalent Ni, Co, and Mn, thus to be doped in the surface region of the lithium composite oxide 200.

Al has a fixed oxidation number of +3, and may prevent a structural collapse due to a change in the oxidation number of the transition metal present on the surface of the lithium composite oxide 200 during storage and use of the secondary battery. In addition, Al may react with fluorine in the electrolyte solution of the secondary battery to form an $AlF_3$ coating part. The $AlF_3$ coating part may highly stabilize the surface structure of the cathode active material. Therefore, life-span and high temperature stabilities of the secondary battery may be improved.

In exemplary embodiments, the aluminum-containing compound may be amorphous. In this case, the surface of the lithium composite oxide 200 may be more uniformly coated to evenly protect the surface of the cathode active material.

In exemplary embodiments, the aluminum-containing compound may include at least one of amorphous $Al_2O_3$, lithium-aluminum oxide, AlOOH, and $Al(OH)_3$.

In exemplary embodiments, an aluminum content of the first coating part 210 may be 400 to 3,000 ppm based on a total weight of the cathode active material 20. Within the above content range, the surface structure of the cathode active material 20 may be effectively stabilized. Preferably, the aluminum content of the first coating part 210 may be 500 to 2,000 ppm based on the total weight of the cathode active material 20.

The second coating part 220 may be formed on the first coating part 210. In some embodiments, the second coating part 220 may at least partially cover the surface of the first coating part 210.

For example, the second coating part 220 may be provided as an entire coating for entirely covering the surface of the first coating part 210 or a partial coating for partly covering the first coating part 210. In some embodiments, a plurality of the partial coatings may be spaced apart from each other on the surface of the first coating part 210 to be disposed in a form of an island.

The second coating part 220 may contain boron. For example, the second coating part 220 may include a boron-containing oxide.

For example, the boron-containing oxide may make the surface of the first coating part 210 be smooth. The boron-containing oxide may be filled in irregularities existing on the surface of the first coating part 210 to provide a substantially smooth surface. In this case, the specific surface area of the cathode active material is reduced, such that side reactions with the electrolyte may be suppressed. Accordingly, the life-span and storage properties of the cathode active material may be improved.

In exemplary embodiments, the boron-containing oxide may be amorphous. In this case, the second coating part 220 may more uniformly coat the first coating part 210, thereby reducing the specific surface area of the cathode active material.

In exemplary embodiments, the boron-containing oxide may include at least one of amorphous lithium-boron oxides, LiBO, $Li_2BO_2$, $Li_2B_4O_7$ and $Li_4BO_3$.

In some embodiments, aluminum included in the first coating part 210 may be inserted into and doped to the surface of the lithium composite oxide 200 in a predetermined depth.

In some embodiments, boron included in the second coating part 220 may be inserted into and doped to the first coating part 210 at a predetermined depth.

In exemplary embodiments, when forming the first coating part 210 and the cathode active material 20, an excess amount (amount of half or more) of the introduced aluminum may remain in the surface region of the cathode active material 20. For example, aluminum may not penetrate deeply into the lithium composite oxide 200. Accordingly, aluminum may be intensively distributed on an outside (surface side) of the cathode active material 20.

For example, an amount of aluminum eluted when dissolving the cathode active material 20 at a dissolution degree of 5% (relative to time) taken to completely dissolve the cathode active material 20 from the surface may be 50% by weight or more, based on an amount of aluminum eluted when the cathode active material is completely dissolved from the surface. Accordingly, aluminum may be intensively distributed on the surface of the cathode active material 20, such that the surface structure of the cathode active material 20 may be highly stabilized.

In exemplary embodiments, the first coating part 210 may have a thickness of 1 to 20 nm, and the doping depth may be 1 to 200 nm. Within the above thickness range, capability for transferring lithium may be maintained while protecting the surface structure of the cathode active material.

In exemplary embodiments, the second coating part 220 may have a thickness of 3 to 20 nm. Within the above thickness range, capacity of the lithium secondary battery may not be reduced, while effectively decreasing the specific surface area of the cathode active material.

In exemplary embodiments, a thickness ratio of the first coating part 210 and the second coating part 220 may be 1:0.5 to 1:5. When the thickness of the second coating part 220 is thicker than the above ratio, the capacity and output characteristics of the cathode active material may be decreased. When the thickness of the second coating part 220 is thinner than the above ratio, the specific surface area of the cathode active material may not be sufficiently reduced.

Figure 3:
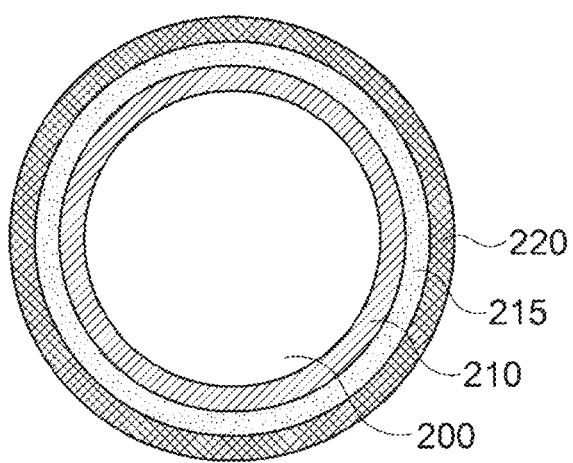

FIG. 3 is a schematic cross-sectional view of the cathode active material for a lithium secondary battery according to exemplary embodiments. Details of the contents substantially the same as those of configurations described with reference to FIG. 1 will not be described.

Referring to FIG. 3, the cathode active material 22 for a lithium secondary battery may further include an intermediate part 215.

The intermediate part 215 may be formed between the first coating part 210 and the second coating part 220. The intermediate part 215 may be formed throughout the surface of the first coating part 210, and the second coating part 220 may entirely cover the intermediate part 215.

The intermediate part 215 may contain aluminum and boron together. For example, the intermediate part 215 may include the aluminum-containing compound, the boron-containing oxide, and/or a lithium-aluminum-boron compound.

In some embodiments, the lithium-aluminum-boron compound may be amorphous or crystalline.

For example, this compound may include at least one of lithium boron aluminum-containing oxides such as $LiAlBOH_4$, $Li_4AlB$, and $Li_3AlB_3O$.

For example, the aluminum content of the intermediate part 215 may be gradually decreased from the first coating part 210 side to the second coating part 220 side. The boron content of the intermediate part 215 may be gradually increased from the first coating part 210 side to the second coating part 220 side. In some embodiments, the content of aluminum and the content of boron may be complementary. For example, the boron content may be increased by an amount equivalent to the decreased aluminum content. Accordingly, a sum of the aluminum content and the boron content may be maintained substantially the same.

Hereinafter, a method of manufacturing a cathode active material according to the embodiments of the present invention described above is provided.

According to exemplary embodiments, metal salts of the active material may be prepared. The metal salts of the active material may include, for example, nickel salts, manganese salts, and cobalt salts. Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, and a hydrate thereof, etc.

The metal salts may be mixed with a precipitant and/or a chelating agent in a ratio satisfying the content of each metal or the concentration ratios described with reference to Formula 1 to prepare an aqueous solution. The aqueous solution may be co-precipitated in a reactor to prepare a composite metal salt compound (e.g., an NCM precursor).

The precipitant may include an alkaline compound such as sodium hydroxide (NaOH), sodium carbonate ($Na_2CO_3$) and the like. The chelating agent may include, for example, ammonia water (e.g., $NH_3H_2O$), ammonium carbonate (e.g., $NH_3HCO_3$) and the like.

Thereafter, the lithium salt compound may be mixed with the composite metal salt compound and reacted by co-precipitation to prepare lithium metal oxide particles. The lithium salt compound may include, for example, lithium carbonate, lithium nitrate, lithium acetate, lithium oxide, lithium hydroxide and the like. These compounds may be used alone or in combination of two or more thereof.

The lithium composite may be first calcined to form a lithium metal oxide. The first calcination may be performed, for example, at a temperature of 450 to 850° C. under an oxygen-containing atmosphere.

The lithium composite oxide and the aluminum source are reacted in a wet manner to form a preliminary cathode active material. The preliminary cathode active material may include a first coating part or a preliminary coating part formed on the surface of the lithium composite oxide and the lithium composite oxide. The preliminary coating part may form the first coating part containing aluminum by a subsequent process.

The first coating part or preliminary coating part containing aluminum may be formed by the wet reaction. The first coating part or the preliminary coating part is uniformly applied to the surface of the lithium composite oxide to improve surface stability of the cathode active material on the whole.

The wet reaction may be performed in an aqueous solution.

In exemplary embodiments, an aluminum source solution may be prepared by dissolving a water-soluble aluminum source in water. The wet reaction may be performed by mixing the aluminum source solution with the lithium composite oxide.

After the wet reaction, the filtered and/or dried lithium composite oxide may be provided as a preliminary cathode active material.

For example, lithium nickel oxide exposed on the surface of lithium composite oxide particles reacts with air or moisture during manufacturing and using the cathode active material, and may be decomposed into lithium hydroxide (LiOH), lithium carbonate ($Li_2CO_3$), nickel oxide (NiO), and the like to generate by-products. In addition, nickel ions exposed on the surface react with the electrolyte to cause a phase transition in the surface layer portion of the particles, and modify the crystal structure.

The aluminum source solution may be prepared based on water. Therefore, the by-products may be removed during the wet reaction. In this case, an additional washing process may be omitted, such that process efficiency may be improved. Further, the specific surface area may be increased during washing with water. In this case, by simultaneously performing washing with water and coating with aluminum, an increase in the specific surface area may be suppressed.

In exemplary embodiments, the water-soluble aluminum source may include at least one of aluminum sulfate ($Al_2(SO_4)_3$), lithium aluminum oxide ($LiAlO_2$), and sodium aluminate ($NaAlO_2$). The water-soluble aluminum source may be dissolved in water to form the aluminum source solution. The water-soluble aluminum source dissolved in the aluminum source solution may form a uniform coating part on the surface of the lithium composite oxide.

In some embodiments, the water-soluble aluminum source may include sodium aluminate ($NaAlO_2$). For example, in a case of performing wet coating using an aluminum source containing $NaAlO_2$, it is possible to suppress an elution of lithium ions due to pH stabilization. In addition, an increase in the specific surface area of the lithium composite oxide may be further suppressed. Thereby, it is possible to implement a secondary battery having excellent capacity and life-span characteristics.

In some embodiments, the water-soluble aluminum source may be used in an amount of 500 to 4,000 ppm on the basis the aluminum content based on the weight of the lithium composite active material. Within the above content range, the first coating part may be formed with a desired aluminum content and thickness. Preferably, the water-soluble aluminum source may be used in an amount of 1,500 to 3,000 ppm.

In exemplary embodiments, the drying process of the wet reaction may be performed at 110 to 300° C. In this case, an amorphous aluminum coating part may be formed by heat treatment at a relatively low temperature.

A cathode active material for a lithium secondary battery may be prepared by reacting the preliminary cathode active material with a boron source in a dry manner. The second coating part may be formed on the first coating part by the dry reaction.

The dry reaction may be performed in a non-solution phase. The dry reaction may be performed at a temperature of 250 to 400° C. Under the above temperature conditions, for example, an amorphous boron-containing oxide may be formed to provide as the second coating part. The surface of the first coating part may be uniformly coated with the amorphous boron-containing oxide.

The dry reaction may be performed by mixing (stirring) reactants under high temperature or heating conditions. For example, the preliminary cathode active material and the boron source may be put into a reactor and mixed while heating to prepare the cathode active material for a lithium secondary battery.

In some embodiments, the dry reaction may be performed under an inert atmosphere or an oxygen-containing atmosphere. The inert atmosphere may include a nitrogen or argon gas atmosphere. The oxygen-containing atmosphere may include, for example, an oxidizing atmosphere having an oxygen content of about 20% or more.

In exemplary embodiments, the boron source may include a boric acid compound such as $HBO_2$, $H_3BO_3$, and $H_2B_4O_7$.

In some embodiments, the boron source may be used in an amount of 100 to 1,600 ppm based on the weight of the preliminary cathode active material. Within the above content range, the cathode active material may be uniformly coated with a boron-coating part having an appropriate thickness while preserving electrical properties. Preferably, the boron source may be used in an amount of 200 to 1,200 ppm.

For example, in the dry reaction process, some of the boron component may penetrate into the first coating part or the preliminary coating part. In this case, the intermediate part containing both aluminum and boron may be formed between the first coating part containing aluminum and the second coating part containing boron.

A slurry may be prepared by mixing the cathode active material with a binder, a conductive material and/or a dispersant in a solvent, followed by stirring the same. The slurry may be coated on the cathode current collector 110, followed by compressing and drying to manufacture the cathode 130.

The cathode current collector 110 may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a binder for forming a cathode. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

According to exemplary embodiments, the anode 140 may include an anode current collector 120 and anode active material layers 125 formed by coating the anode current collector 120 with an anode active material.

The anode active material useable in the present invention may include any material known in the related art, so long as it can absorb and desorb lithium ions, without particular limitation thereof. For example, carbon-based materials such as crystalline carbon, amorphous carbon, carbon composite, carbon fiber, etc.; a lithium alloy; silicon or tin may be used. Examples of the amorphous carbon may include hard carbon, cokes, mesocarbon microbead (MCMB) calcined at 1500° C. or lower, mesophase pitch-based carbon fiber (MPCF) or the like. Examples of the crystalline carbon may include graphite-based carbon such as natural graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The anode current collector 120 may include, for example, gold, stainless steel, nickel, aluminum, titanium, copper, or an alloy thereof, and preferably includes copper or a copper alloy.

In some embodiments, a slurry may be prepared by mixing the anode active material with a binder, a conductive material and/or a dispersant in a solvent, followed by stirring the same. The slurry may be coated on the anode current collector 120, followed by compressing and drying to manufacture the anode 140.

As the binder and the conductive material, materials which are substantially the same as or similar to the above-described materials may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

The separation membrane 150 may be interposed between the cathode 130 and the anode 140. The separation membrane 150 may include a porous polymer film made of a polyolefin polymer such as ethylene homopolymer, propylene homopolymer, ethylene/butene copolymer, ethylene/hexene copolymer, ethylene/methacrylate copolymer. The separation membrane may include a nonwoven fabric made of glass fiber having a high melting point, polyethylene terephthalate fiber or the like.

In some embodiments, the anode 140 may have an area and/or volume (e.g., a contact area with the separation membrane 150) larger than those/that of the cathode 130. Thereby, lithium ions generated from the cathode 130 may smoothly move to the anode 140 without being precipitated in the middle, for example. Accordingly, effects of simultaneously improving the output and stability by using the above-described cathode active material may be more easily realized.

According to exemplary embodiments, the electrode cell 160 is defined by the cathode 130, the anode 140, and the separation membrane 150, and a plurality of electrode cells 160 are stacked to form, for example, a jelly roll type electrode assembly. For example, the electrode assembly may be formed by winding, laminating, folding, or the like of the separation membrane.

The electrode assembly is housed in an outer case 170 together with the electrolyte, such that a lithium secondary battery may be defined. According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion (X—) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

Electrode tabs protrude from the cathode current collector 110 and the anode current collector 120, respectively, which belong to each electrode cell, and may extend to one side of the outer case 170. The electrode tabs may be fused together with the one side of the outer case 170 to form electrode leads extending or exposed to an outside of the outer case 170.

The lithium secondary battery may be manufactured, for example, in a cylindrical shape using a can, a square shape, a pouch shape or a coin shape.

Hereinafter, preferred examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

EXAMPLES AND COMPARATIVE EXAMPLES: PREPARATION OF CATHODE ACTIVE MATERIAL

Example 1

(1) Formation of Aluminum-Containing Coating $NaAlO_2$ was dissolved in water so that the Al concentration was 1,500 ppm based on a weight of lithium composite oxide.

The lithium composite oxide $LiNi_{0.83}Co_{0.12}Mn_{0.05}O_2$ was added to $NaAlO_2$ aqueous solution, followed by stirring for 10 minutes, and then filtering the same.

The filtered lithium composite oxide was dried at 130° C. for 24 hours to form a first coating part containing aluminum on a surface of the lithium composite oxide.

Figure 4A:
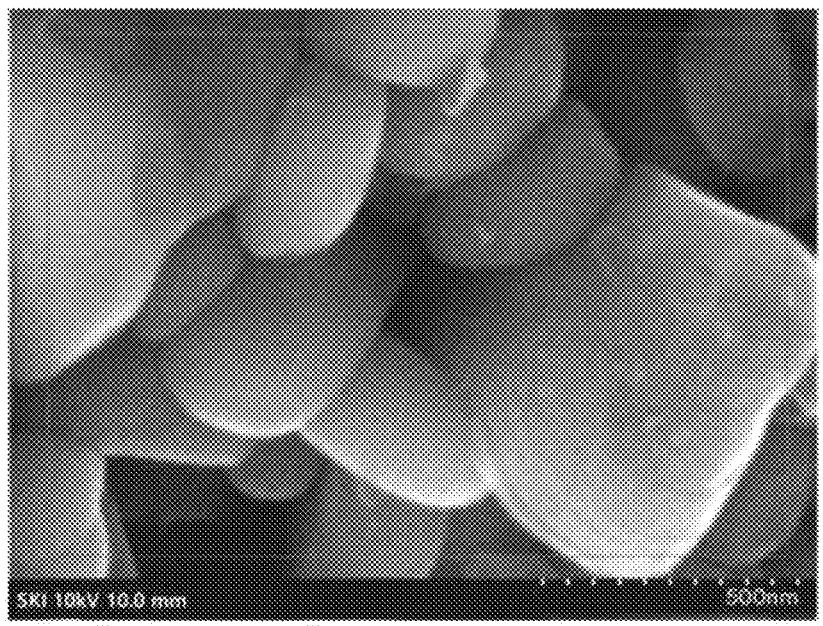
FIGS. 4A and 4B are scanning electron microscopy (SEM) images illustrating a surface of the cathode active material on which a first coating part is formed.
Figure 5A:
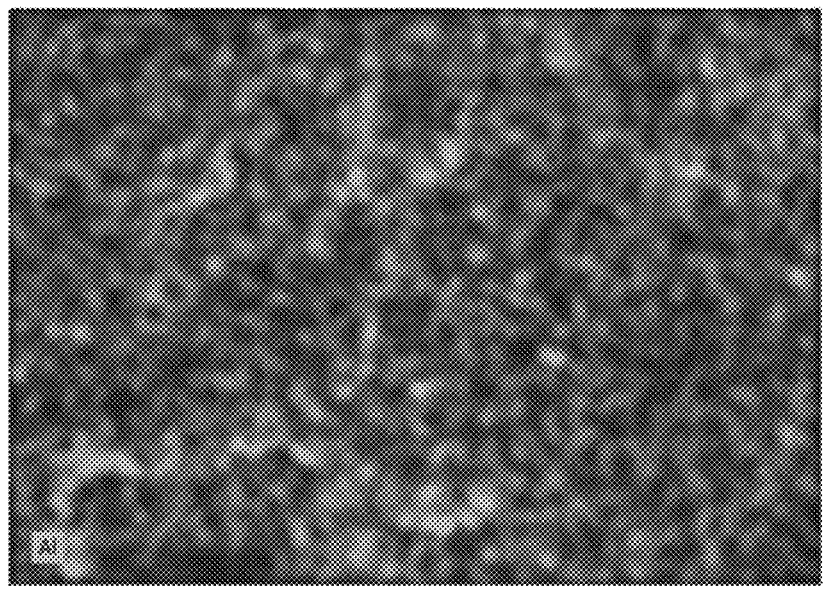
FIGS. 5A and 5B are images respectively illustrating a distribution of aluminum by analyzing the regions corresponding to FIGS. 4A AND 4B using energy-dispersive X-ray spectroscopy (EDS)

The surface of the lithium composite active material on which the first coating part is formed was analyzed by SEM and EDS to obtain images of FIGS. 4A and 5A.

FIG. 4A is a scanning electron microscopy (SEM) image illustrating the surface of the cathode active material on which the first coating part is formed.

FIG. 5A is an image illustrating a distribution of aluminum by analyzing the region corresponding to FIG. 4A using energy-dispersive X-ray spectroscopy (EDS).

SEM was measured under a condition at 10 kV of acceleration voltage, and EDS was measured under conditions at 60 eV/count of pulse throughput, and 10 mm of working distance.

Figure 6A:
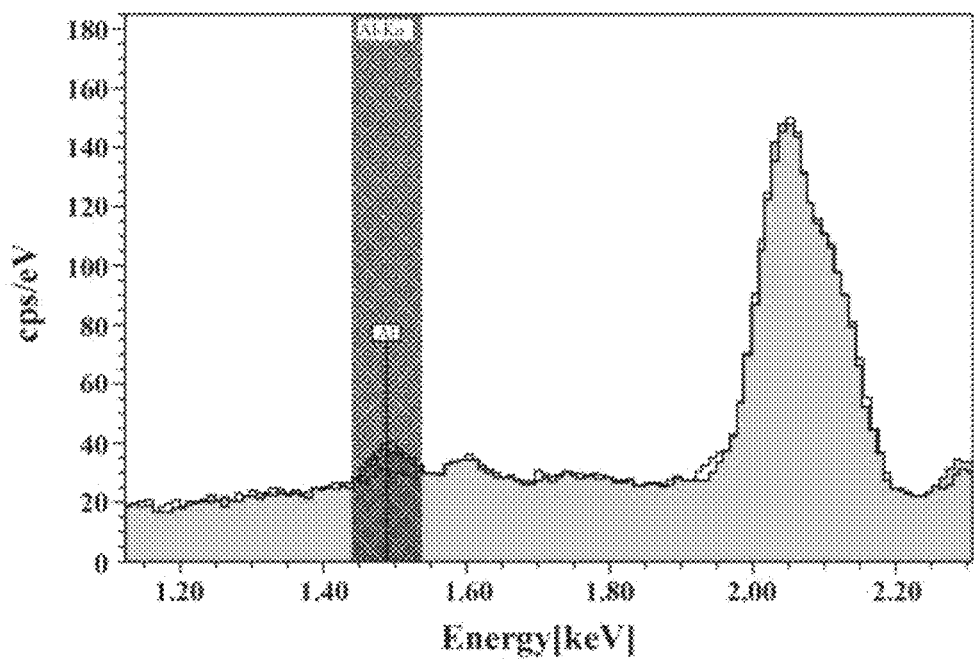
FIGS. 6A and 6B are spectra illustrating points where the distribution of aluminum is high and low among the regions corresponding to FIGS. 5A and 5B, and an average intensity of aluminum.

FIG. 6A is a spectrum by quantitatively analyzing the Al mapped image measured in FIG. 5A using EDS analysis.

(2) Formation of Boron-Containing Coating

The dried lithium composite oxide and 400 ppm of $H_3BO_3$ based on the weight of lithium composite oxide were put into a calcination furnace under an oxygen atmosphere, and then heated at a rate of 2° C./minute while mixing in a dry manner.

The mixture was heated to 300° C., and maintained for 10 hours to prepare a cathode active material on which a second coating part containing boron is formed.

Figure 7:
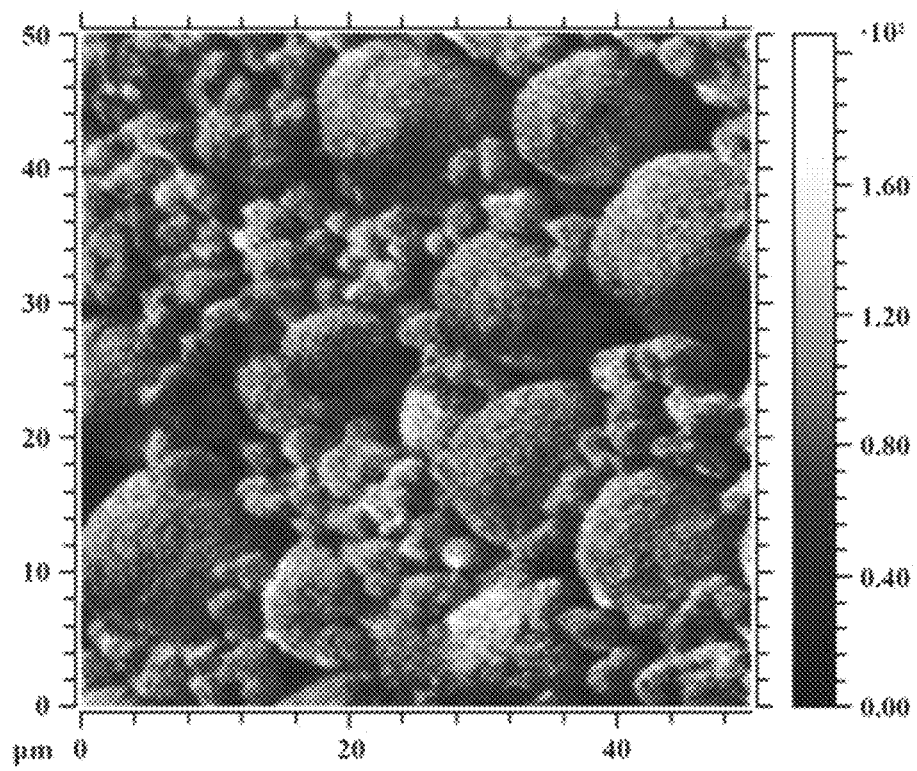
FIG. 7 is time-of-flight secondary ion mass spectrometry (TOF-SIMS) analysis image illustrating the surface of the cathode active material on which a second coating part is formed.

The surface of the prepared cathode active material was analyzed using TOF-SIMS to obtain an image of FIG. 7. At this time, the analysis was performed using TOF-SIMS5 from ION TOF Co. The electrode was attached to a substrate for measurement, followed by degassing for about 30 minutes or more, then a vacuum state was formed to a pressure of $10^{-9}$ mBar or less to remove impurities other than the material to be analyzed. At this time, a mass spectrum of secondary ions emitted was obtained while etching the surface using a $Cs^+$ ion gun.

FIG. 7 is time-of-flight secondary ion mass spectrometry (TOF-SIMS) analysis image illustrating the surface of the cathode active material on which the second coating part is formed.

Referring to FIG. 7, it was confirmed that boron was uniformly distributed throughout the surface of the cathode active material.

Example 2

A cathode active material was prepared according to the same procedures as described in Example 1, except that $NaAlO_2$ was dissolved in water so that the Al concentration was 2,000 ppm to form an aluminum-containing coating part.

Example 3

A cathode active material was prepared according to the same procedures as described in Example 1, except that $NaAlO_2$ was dissolved in water so that the Al concentration was 2,500 ppm to form an aluminum-containing coating part.

Example 4

A cathode active material was prepared according to the same procedures as described in Example 1, except that $NaAlO_2$ was dissolved in water so that the Al concentration was 3,000 ppm to form an aluminum-containing coating part.

Example 5

A cathode active material was prepared according to the same procedures as described in Example 1, except that $NaAlO_2$ was dissolved in water so that the Al concentration was 2,500 ppm to form an aluminum-containing coating part, and 200 ppm of $H_3BO_3$ was used to form a boron-containing coating part.

Example 6

A cathode active material was prepared according to the same procedures as described in Example 1, except that $NaAlO_2$ was dissolved in water so that the Al concentration was 2,500 ppm to form an aluminum-containing coating part, and 800 ppm of $H_3BO_3$ was used to form a boron-containing coating part.

Example 7

A cathode active material was prepared according to the same procedures as described in Example 1, except that $NaAlO_2$ was dissolved in water so that the Al concentration was 2,500 ppm to form an aluminum-containing coating part, and 1,200 ppm of $H_3BO_3$ was used to form a boron-containing coating part.

Example 8

A cathode active material was prepared according to the same procedures as described in Example 1, except that $NaAlO_2$ was dissolved in water so that the Al concentration was 2,500 ppm to form an aluminum-containing coating part, and 1,600 ppm of $H_3BO_3$ was used to form a boron-containing coating part.

Example 9

$NaAlO_2$ was dissolved in water so that the Al concentration was 2,500 ppm.

Lithium composite oxide $LiNi_{0.88}Co_{0.9}Mn_{0.03}O_2$ was added to the $NaAlO_2$ aqueous solution, followed by stirring for 10 minutes, and then filtering the same.

The lithium composite oxide had a form which was a secondary particle having a particle diameter of less than 7 μm in which primary particles having a particle diameter of 1 μm or more were aggregated, or a monolithic particle having a particle diameter of less than 7 μm.

In addition, a cathode active material was prepared according to the same procedures as described in Example 1, except that 800 ppm of $H_3BO_3$ was used to form a boron-containing coating part.

Comparative Example 1

(1) Formation of Aluminum-Containing Coating

Lithium composite oxide $LiNi_{0.83}Co_{0.12}Mn_{0.05}O_2$ and 1,000 ppm of $Al_2O_3$ having a particle diameter of about 30 to 70 nm were added to a dry high-speed mixer and uniformly mixed for 5 minutes. The mixture was put into a calcination furnace, heated to 700° C. at a rate of 2° C./min, and maintained at 700° C. for 10 hours. Oxygen was continuously passed at a flow rate of 10 mL/min during heating and maintenance. After completion of the calcination, the mixture was naturally cooled to room temperature, followed by grinding and classification to prepare a cathode active material coated with $Al_2O_3$ in a dry manner.

(2) Formation of Boron-Containing Coating

The cathode active material was added to an aqueous solvent, stirred for 30 minutes, then filtered to remove the solvent, and dried in a vacuum oven at 150° C. for 24 hours. The dried active material and 400 ppm of $H_3BO_3$ were put into a dry high-speed mixer and uniformly mixed for 5 minutes. The mixture was put into a calcination furnace and heated to 300° C. at a heating rate of 2° C./min, and maintained at 300° C. for 5 hours. Oxygen was continuously passed at a flow rate of 10 mL/min during heating and maintenance. After completion of the calcination, the mixture was naturally cooled to room temperature, followed by grinding and classification to prepare a cathode active material.

Figure 4B:
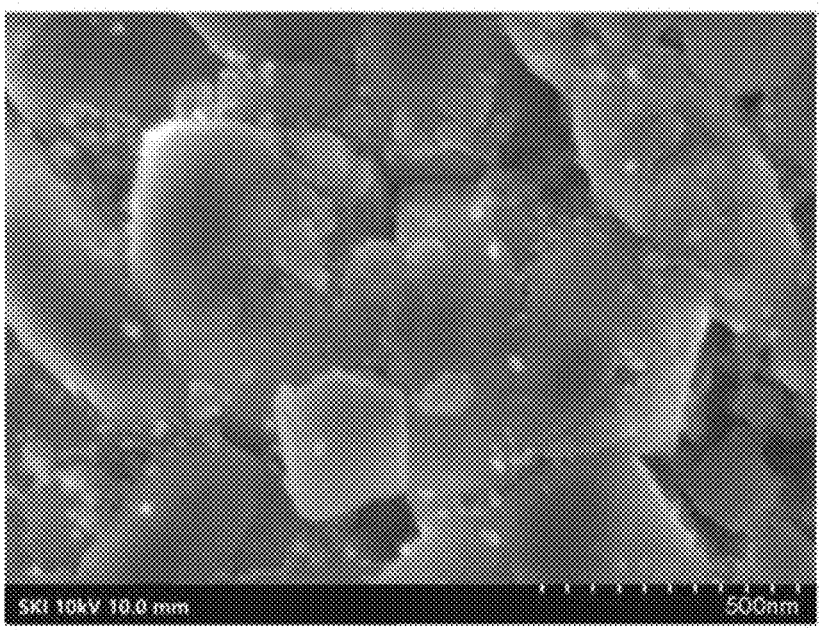

FIG. 4B is an SEM image illustrating the surface of the cathode active material prepared according to Comparative Example 1.

Figure 5B:
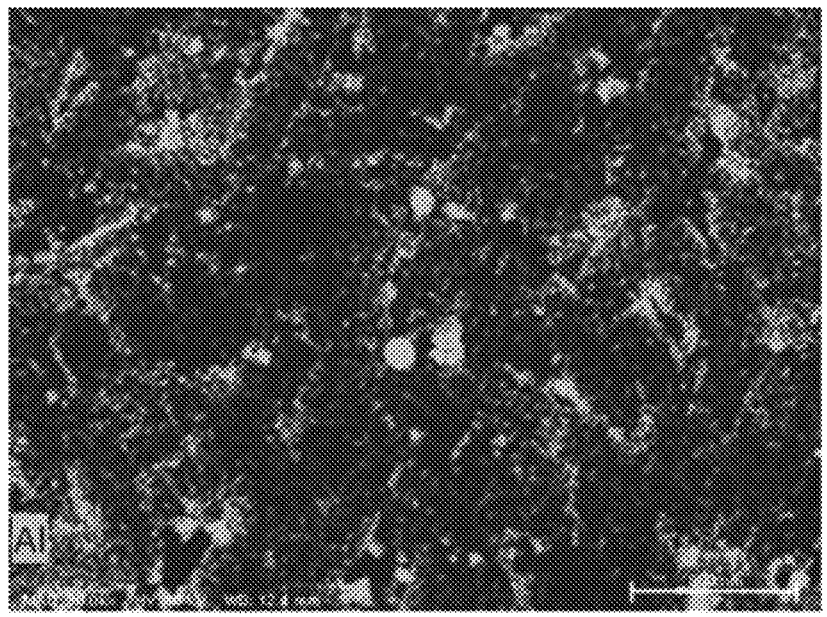

FIG. 5B is an image illustrating a distribution of aluminum by analyzing the region corresponding to FIG. 4B using EDS.

Figure 6B:
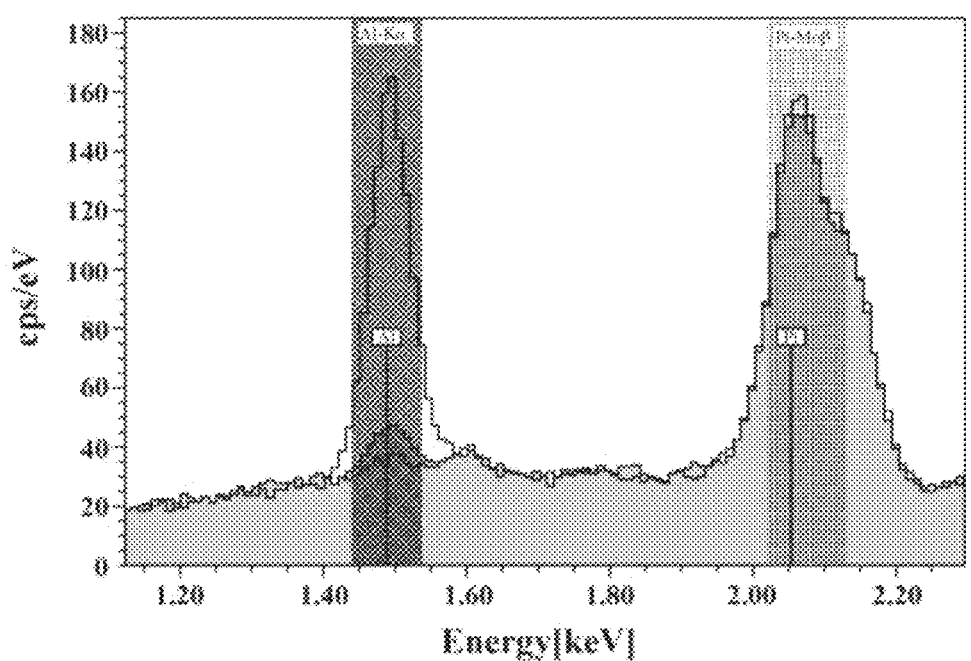

FIG. 6B is an EDS analysis spectrum of the Al mapped image shown in FIG. 5B.

Comparative Example 2

Al isopropoxide of an Al-containing source was added to ethanol so that the Al concentration was 1,000 ppm, and heated to 60° C. to sufficiently dissolve Al in an ethanol solvent. A lithium composite oxide $LiNi_{0.83}Co_{0.12}Mn_{0.05}O_2$ was added to an ethanol solution in which Al was dissolved, and introduced into a sealed reactor, then a vacuum state was formed while heating to 90° C. or higher to obtain a cathode material from which the organic solvent was removed.

The cathode material was put into a calcination furnace and heated to 600° C. at a rate of 2° C./min, and maintained at 600° C. for 10 hours. Oxygen was continuously passed at a flow rate of 10 mL/min during heating and maintenance. After completion of the calcination, the mixture was naturally cooled to room temperature, followed by grinding and classification to prepare a cathode active material coated with Al.

Comparative Example 3

A cathode active material was prepared according to the same procedures as described in Example 1, except that the aluminum-containing coating part was not formed.

Specifically, instead of the process of forming the aluminum-containing coating part, the lithium composite active material was washed with distilled water for 10 minutes while stirring, and dried, then a boron-containing coating part was formed on the dried lithium composite active material according to the same procedures as described in Example 1.

Comparative Example 4

A cathode active material was prepared according to the same procedures as described in Example 1, except that the boron-containing coating part was not formed.

Specifically, calcination was performed according to the same procedures as described in Example 1 without adding a boron source ($H_3BO_3$) to the lithium composite oxide on which the aluminum-containing coating part was formed.

Comparative Example 5

A cathode active material was prepared according to the same procedures as described in Example 9, except that the aluminum-containing coating part was not formed.

Specifically, instead of the process of forming the aluminum-containing coating part, the lithium composite active material was washed with distilled water for 10 minutes while stirring, and dried, then a boron-containing coating part was formed on the dried lithium composite active material according to the same procedures as described in Example 9.

Experimental Example 1: Analysis of Total Coating Amount 0.01 g of cathode material was completely dissolved in 40 ml of hydrochloric acid (2%) for 3 hours. After diluting the solution by about 10 times, multiple elements included in the entire solution were detected using inductively coupled plasma-optical emission spectroscopy (ICP-OES; Optima 7300DV, PerkinElmer Co).

Concentrations of Al and B in the multiple elements represent the coating amounts of the Al and B components in the cathode active material, which are shown in Table 1 below.

TABLE 1

| | Input amount (ppm) | | Coating amount (ppm) | | |
|---|---|---|---|---|---|
| | Al source | B source | Al coating | B coating | Remark |
| Example 1 | 1500 | 400 | 955 | 398 | |
| Example 2 | 2000 | 400 | 1100 | 395 | |
| Example 3 | 2500 | 400 | 1450 | 397 | |
| Example 4 | 3000 | 400 | 1750 | 400 | |
| Example 5 | 2500 | 200 | 1400 | 198 | |
| Example 6 | 2500 | 800 | 1450 | 795 | |
| Example 7 | 2500 | 1200 | 1450 | 1201 | |
| Example 8 | 2500 | 1600 | 1480 | 1580 | |
| Example 9 | 3000 | 400 | 1800 | 400 | Monolithic particle used |
| Comparative Example 1 | 1000 | 400 | 980 | 395 | $Al_2O_3$ |
| Comparative Example 2 | 1000 | — | 1010 | — | Al isopropoxide |
| Comparative Example 3 | — | 400 | — | 403 | |
| Comparative Example 4 | 1500 | — | 955 | — | |
| Comparative Example 5 | — | 400 | — | 400 | Monolithic particle used |

Referring to Table 1, it was confirmed that the coating amount of Al in the prepared cathode active material was decreased compared to an input amount of Al source because the cathode material was coated by a wet process and then filtered during coating with aluminum. It was shown that Al content in the cathode active material was 50 to 60% compared to the input amount.

On the other hand, it was exhibited that the input amount of the boron source and the coating amount of boron were substantially the same.

Experimental Example 2: Analysis of Coating Amount on Outside

In Experimental Example 1, a distribution of Al on an outside of the cathode active materials prepared in Example 1, and Comparative Examples 1 and 2 was analyzed by initially etching the surface of the cathode material by changing a dissolution degree to about 5% compared to the complete dissolution.

The dissolution degree was adjusted by setting a dissolution time to about 5 minutes compared to about 1 hour and 40 minutes upon the actual complete dissolution time of Experimental Example 1.

TABLE 2

| | Example 1 | Comparative Example 1 | Comparative Example 2 |
|---|---|---|---|
| Total Al concentration (ppm) | 955 | 980 | 1010 |
| Al concentration on outside (ppm) | 484 | 99 | 191 |
| Initial elution amount (%) | 59.8 | 10 | 19 |

For example, in a case of Example 1, since the Al coating part is subjected to heat treatment at a relatively low temperature (e.g., 300° C.), Al is mainly distributed on an outer surface of the cathode active material, and a doping depth is about 100 nm.

On the other hand, in a case of Comparative Examples 1 and 2, when performing heat treatment at a low temperature (300° C.), the surface of the cathode material is non-uniformly coated, such that electrochemical properties (discharge capacity and life-span) are significantly reduced. Therefore, it is necessary to perform heat treatment at a high temperature (600 to 700° C.). In this case, a significant amount of the aluminum component is diffused and doped to an inside of the cathode active material. Accordingly, the aluminum content of the outer surface of the cathode active material is decreased.

Therefore, referring to Table 2, in a case of Comparative Example 1 and Comparative Example 2, it was exhibited that the Al concentrations detected after 5 minutes from etching were 99 ppm and 191 ppm, respectively, which correspond to 10% and 19% based on the total coating amount of Al.

On the other hand, in a case of Example 1, it was confirmed that the amount of Al detected after 5 minutes from etching was 484 ppm, such that the aluminum component was eluted by 50% or more due to initial etching.

Experimental Example 3: Energy-Dispersive X-Ray Spectroscopy (EDS) Spectrum Analysis SEM images (FIGS. 4A and 4B) with a high magnification (20,000 times or more) were obtained from the cathode active materials prepared in Example 1 and Comparative Example 1.

The aluminum component of regions respectively corresponding to FIGS. 4A and 4B was mapped using EDS to obtain images of FIGS. 5A and 5B. In addition, EDS analysis spectra (FIGS. 6A and 6B) of regions corresponding to the images shown in FIGS. 5A and 5A were obtained.

Referring to FIGS. 5A and 5B, it was confirmed that the cathode active material prepared in Example 1 was uniformly distributed on the surface of the aluminum component compared to the cathode active material prepared in Comparative Example 1.

EDS analysis spectra were obtained by acquiring EDS data of 10 random points in the region corresponding to shown in FIGS. 5A and 5B, and calculating an average value of the data. Aluminum peaks were normalized through an intensity of the Pt peak (2.05 keV) of Pt coating applied to an EDS sample.

In the analysis spectra of FIGS. 6A and 6B, the aluminum peaks appeared in the region of about 1.43 to 1.55 keV.

In the spectrum of FIG. 6B in which the cathode active material prepared in Comparative Example 1 is analyzed, the highest value of the aluminum peak intensity was about 3.4 times (50 vs 170) or more of the average value. That is, it was confirmed that $Al_2O_3$ was partially agglomerated and present on the surfaces of the lithium metal oxide particles.

On the other hand, in the spectrum of FIG. 6A in which the cathode active material prepared in Example 1 is analyzed, it was confirmed that each of the highest intensity and the lowest intensity of the aluminum peak had a deviation within about 10% based on the average intensity.

Experimental Example 4: Analysis of Coating Amount of Boron

Figure 8:
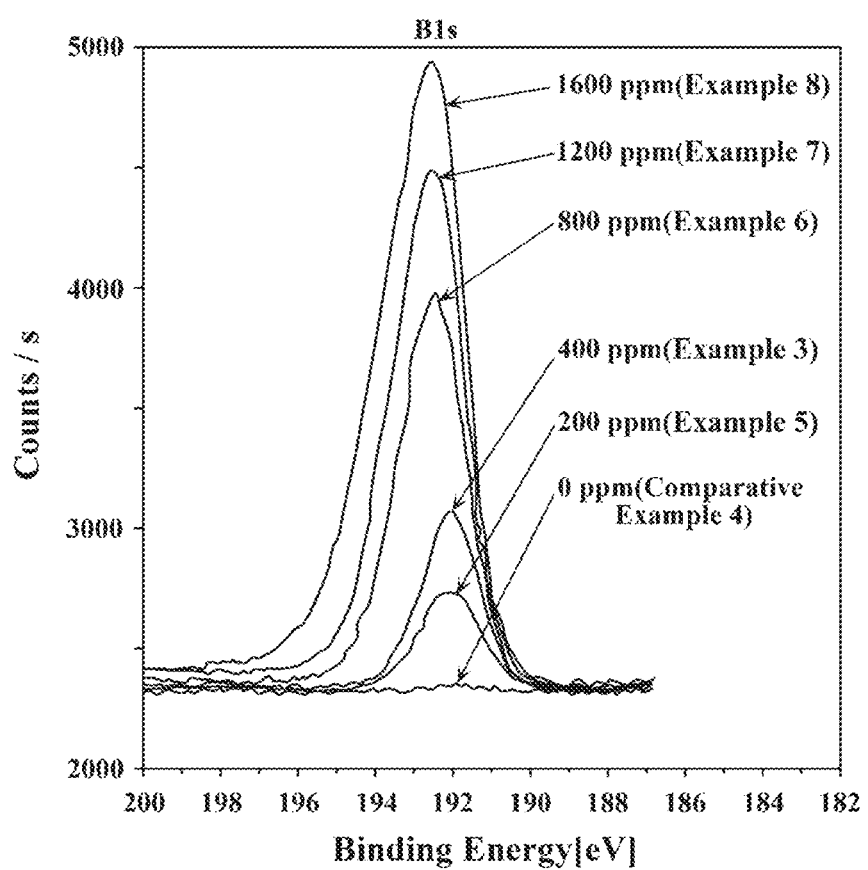
FIG. 8 is an XPS analysis spectrum of the second coating part according to exemplary embodiments.

The surfaces of the cathode active materials prepared in the examples and the comparative examples were analyzed using X-ray photoelectron spectroscopy (XPS) to obtain a spectrum of FIG. 8.

Referring to FIG. 8, as the amount of boron used to form the second coating part was increased, the intensity of the boron peak was linearly increased. Therefore, it was confirmed that the thickness of the boron-coating part was also increased as the amount of boron used to form the boron-coating part was increased.

Experimental Example 5: Analysis of Etching Profile

Figure 9:
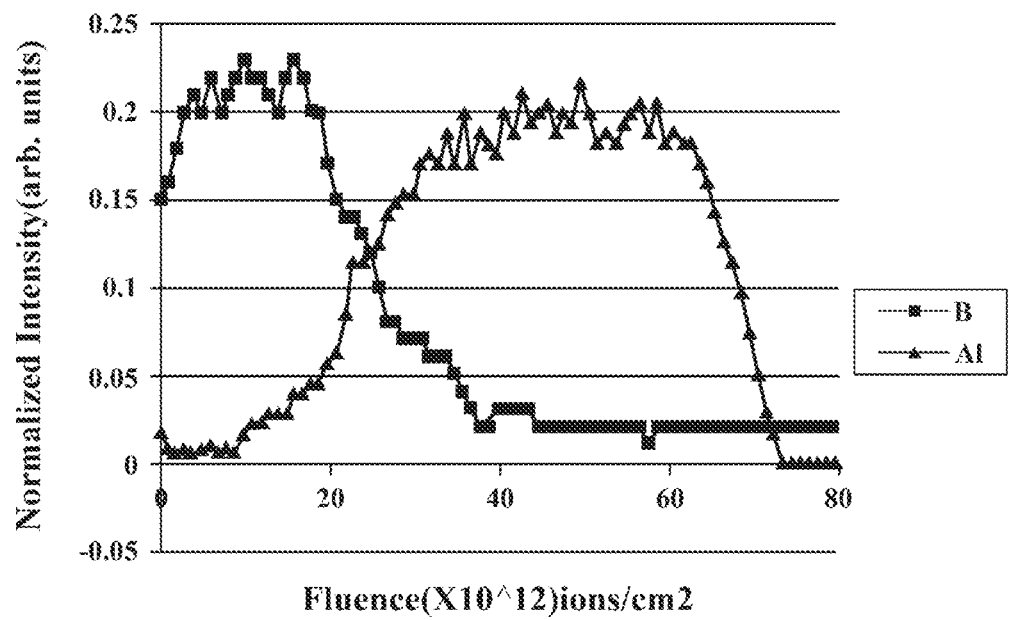
FIG. 9 is a graph illustrating amounts of aluminum and boron for an etching degree of the cathode active materials according to exemplary embodiments.

Concentrations (contents) of Al and B of the cathode active materials prepared in the examples were analyzed according to the number of electrons emitted from a $Cs^+$ ion gun through TOF-SIMS to obtain a graph of FIG. 9.

It was confirmed that a B-containing coating part corresponding to the second coating part is present from the particle surface to a specific depth, and an Al-containing coating part corresponding to the first coating part is present at the bottom thereof. In addition, it was confirmed that an intermediate part simultaneously containing B and Al is present between the second coating part and the first coating part.

Figure 10:
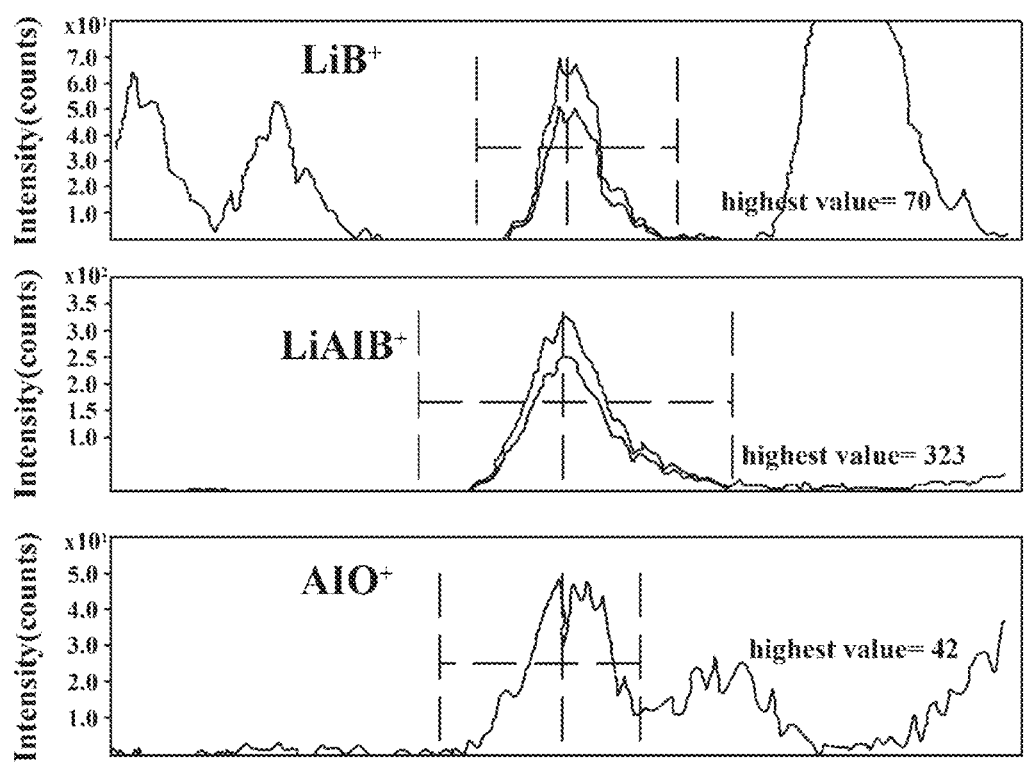
FIG. 10 is a TOF-SIMS analysis spectrum of an intermediate part of the cathode active material according to exemplary embodiments.

FIG. 10 is a TOF-SIMS analysis spectrum of the intermediate part.

Referring to FIG. 10, in the intermediate part, a $LiB^+$ peak containing B found in the first coating part and an $AlO^+$ peak containing Al found in the second coating part were simultaneously confirmed. In addition, in the intermediate part, a LiAlB+ peak that is a composite compound of Al and B, which is not present in the first coating part and the second coating part, was found. Although not shown in FIG. 10, Li—Al—B complex compounds such as $LiAlBOH_4$, $Li_4AlB$, and $Li_3AlB_3O$ were also observed in the intermediate part.

Preparative Example: Manufacturing of Secondary Battery

Secondary batteries were manufactured using the cathode active materials prepared in the examples and the comparative examples.

Specifically, the cathode active materials, Denka Black as a conductive material and PVDF as a binder were mixed in a mass ratio composition of 93:5:2, respectively, to prepare a cathode slurry. Then, the slurry was applied to an aluminum current collector, and a cathode was prepared through drying and pressing. After the pressing, the cathode was controlled so as to have an electrode density of 3.0 g/cc or more.

An anode slurry, which includes 93 wt. % of natural graphite as an anode active material, 5 wt. % of KS6 as a flake type conductive material, 1 wt. % of styrene-butadiene rubber (SBR) as a binder, and 1 wt. % of carboxymethyl cellulose (CMC) as a thickener, was prepared. The anode slurry was applied to a copper substrate, followed by drying and pressing to prepare an anode.

The cathodes and the anodes prepared as described above were respectively notched in a predetermined size and stacked, then an electrode cell was fabricated between the cathode and the anode with a separator (polyethylene, thickness: 25 μm) interposed therebetween. Thereafter, tap parts of the cathode and the anode were welded, respectively. A combination of the welded cathode/separator/anode was put into a pouch, followed by sealing three sides of the pouch except for one side into which an electrolyte is injected. At this time, a portion having the electrode tab was included in the sealing part. After injecting the electrolytic through the remaining one side except for the sealing part, the remaining one side was also sealed, followed by impregnation for 12 hours or more.

The electrolyte used herein was prepared by dissolving 1M $LiPF_6$ solution in a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

Experimental Example 6: Evaluation Initial Capacity

Initial discharge capacities were measured by charging (CC/CV 0.1 C 4.3 V 0.05 CA CUT-OFF) and discharging (CC 0.1 C 3.0 V CUT-OFF) once with the secondary batteries according to the preparative example (CC: constant current, CV: constant voltage).

Experimental Example 7: Evaluation of Life-Span

Initial discharge capacities were measured by charging (CC/CV method, current rate 0.5 C, upper limit voltage 4.3 V, cut-off current 0.05 C) and discharging (CC method, current rate 1.0 C, lower limit voltage 3.0 V) at room temperature with the secondary batteries according to the preparative example.

A capacity retention rate was calculated by dividing the discharge capacity according to the number of charging/discharging times (cycles) by the initial discharge capacity while repeating charging and discharging, and calculation results according to the examples and comparative examples are shown in Table 3 below.

TABLE 3

|  | Input amount (ppm) | | Al coating amount (ppm) | Evaluation of coin cell | | | Lifetime maintenance rate (@300 cycles) |
|  | Al source | B source | | Charge amount (mAh/g) | Discharge amount (mAh/g) | Efficiency (%) | |
| --- | --- | --- | --- | --- | --- | --- | --- |
| Example 1 | 1500 | 400 | 955 | 226.4 | 206.9 | 91.3 | 80.0% |
| Example 2 | 2000 | 400 | 1100 | 226.2 | 206.5 | 91.2 | 83.2% |
| Example 3 | 2500 | 400 | 1450 | 226.5 | 206.4 | 91.1 | 85.3% |
| Example 4 | 3000 | 400 | 1750 | 226.5 | 205.1 | 90.5 | 85.4% |
| Example 5 | 2500 | 200 | 1400 | 226.5 | 206.0 | 90.9 | 81.2% |
| Example 6 | 2500 | 800 | 1450 | 226.5 | 206.8 | 91.3 | 86.5% |
| Example 7 | 2500 | 1200 | 1450 | 226.5 | 204.9 | 90.9 | 86.3% |
| Example 8 | 2500 | 1600 | 1480 | 226.0 | 203.1 | 89.8 | 79.0% |
| Example 9 | 3000 | 400 | 1800 | 237.6 | 212.2 | 89.3 | 82.0% |
| Comparative Example 1 | 1000 | 400 | 980 | 226.0 | 203.5 | 90.0 | 75.0% |
| Comparative Example 2 | 1000 | — | 1010 | 225.5 | 202.0 | 89.5 | 73.0% |
| Comparative Example 3 | — | 400 | — | 226.1 | 207.7 | 91.5 | 68.0% |
| Comparative Example 4 | 1500 | — | 955 | 226.0 | 205.6 | 90.9 | 65.4% |
| Comparative Example 5 | — | 400 | — | 236.9 | 210.9 | 89.0 | 58.0% |

(1) Comparison of Double Coating Part and Single Coating Part

Figure 11:
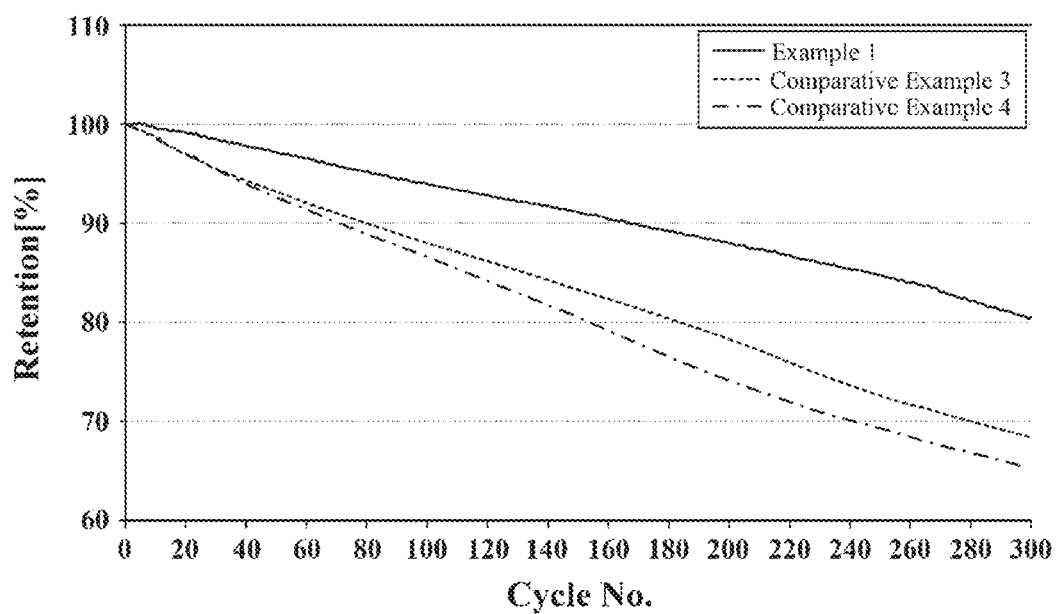
FIG. 11 is a graph for evaluating life-spans of lithium secondary batteries including cathode active materials prepared in the examples and the comparative examples.

Capacity retention rates according to the number of charging/discharging cycles of the secondary batteries using cathode active materials having Al—B double coating (Example 1), Al single coating (Comparative Example 3) and B single coating (Comparative Example 4) are shown in a graph of FIG. 11.

Referring to FIG. 11, in a case of the secondary battery of Example 1, it was confirmed that the capacity was maintained at about 80% or more even after 300 cycles were performed. On the other hand, it was confirmed that the capacities of the secondary batteries of Comparative Example 3 and Comparative Example 4 are decreased to about 70% or less after 300 cycles.

(2) Comparison of Al Coating Amount of the First Coating Part

In the secondary batteries of Examples 1 to 4, a life-span retention rate was improved as the Al coating amount was increased.

(3) Comparison of B Coating Amount of the Second Coating Part

In the secondary batteries of Examples 3 and 5 to 8, initial discharge efficiency and life-span retention rate were increased as the B coating amount was increased. In the case of Examples 3 and 5 to 7 in which the coating amount of boron was about 200 to 1200 ppm, the boron coating part had an appropriate thickness, such that ionic conductivity for lithium ions and electrical conductivity of the surface of the cathode material were excellently maintained.

(4) Comparison of Monolithic Particle Cathode Materials

Figure 12:
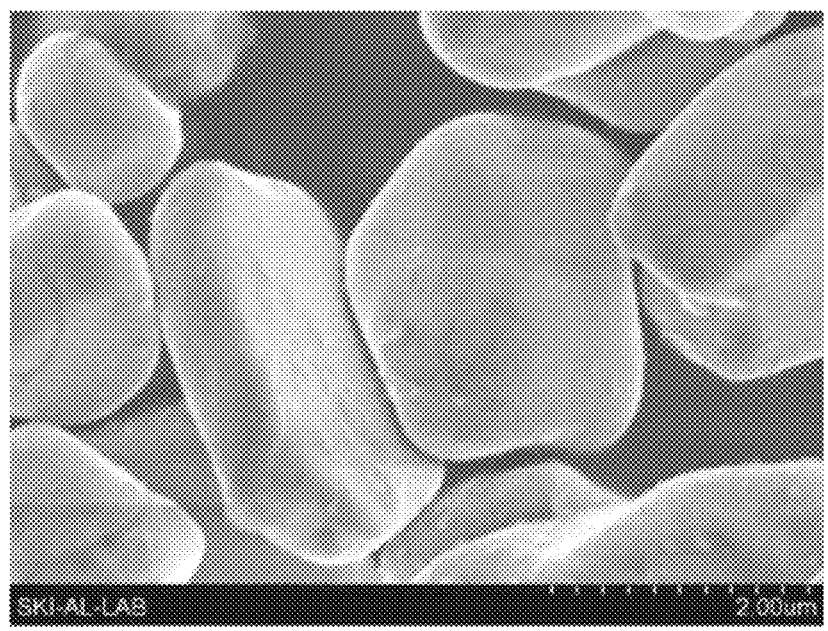
FIG. 12 is an SEM image illustrating a cathode active material prepared in Example 9.

FIG. 12 is an SEM image illustrating the surface of a cathode active material (Example 9) using lithium composite oxide particles having a monolithic particle structure of a $LiNi_{0.88}Co_{0.9}Mn_{0.03}O_2$ composition.

The cathode active material of Comparative Example 5 was also prepared using lithium composite oxide particles having a monolithic particle structure similar to Example 9.

In a case of Example 9 in which the double coating part was formed, the discharge capacity and efficiency were improved compared to Comparative Example 5 in which only the boron-coating part was formed.

Figure 13:
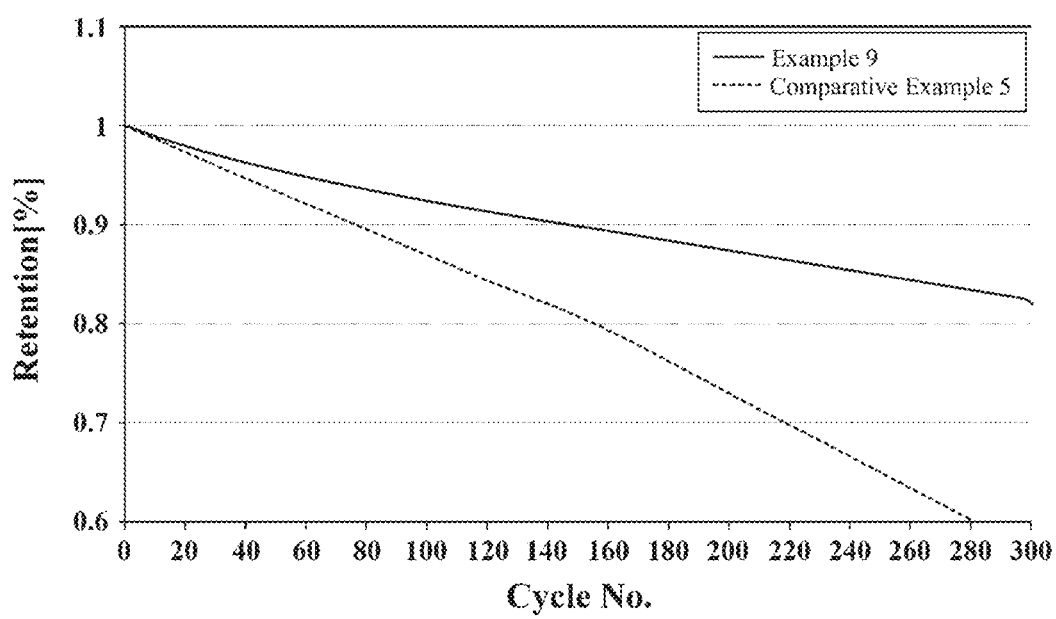
FIG. 13 is a graph for evaluating life-spans of lithium secondary batteries including cathode active materials prepared in the examples and the comparative examples.

FIG. 13 is a graph for evaluating life-spans of secondary batteries using cathode active materials prepared in Example 9 and Comparative Example 5.

Referring to FIG. 13, the life-span retention rate of the secondary battery of Example 9 was 82% or more after 300 cycles, which was more significantly improved than 58% of Comparative Example 5.

DESCRIPTION OF REFERENCE NUMERALS

110: Cathode current collector
115: Cathode active material layer
120: Anode current collector
125: Anode active material layer
130: Cathode
140: Anode
150: Separation membrane
160: Electrode cell
170: Outer case

What is claimed is:

1. A cathode active material for a lithium secondary battery comprising:
   a lithium composite oxide;
   a first coating part formed on a surface of the lithium composite oxide and containing aluminum, the first coating part having a thickness of 1 to 20 nm;
   a second coating part formed on the first coating part and containing boron, the second coating part having a thickness of 3 to 20 nm; and
   an intermediate part containing both aluminum and boron between the first coating part and the second coating part,
   wherein a doping depth of aluminum in the lithium composite oxide is from 1 to 200 nm,
   wherein an amount of aluminum eluted by dissolving the cathode active material in hydrochloric acid for 5% of a time taken to completely dissolve the cathode active material in hydrochloric acid from a surface thereof is 50% by weight or more, based on an amount of aluminum eluted by completely dissolving the cathode active material from the surface thereof, wherein, in the intermediate part, at least one fragmented ion of LiAlB+, LiAlBOH$_4^+$, Li$_4$AlB$^+$ and Li$_3$AlB$_3$O$^+$ is detected upon time-of-flight secondary ion mass spectrometry (TOF-SIMS) analysis, wherein an aluminum content of the first coating part is 955 to 1,800 ppm based on a total weight of the cathode active material, wherein a boron content of the second coating part is 800 to 1,200 ppm based on a total weight of the cathode active material.

2. The cathode active material for a lithium secondary battery according to claim 1, wherein the first coating part has a deviation in an aluminum content of less than 20% in an entire region on the surface thereof.

3. The cathode active material for a lithium secondary battery according to claim 2, wherein the aluminum content of the first coating part is measured by an intensity of an aluminum peak in an energy-dispersive X-ray spectroscopy (EDS) analysis spectrum, and the deviation is defined as a percentage of a difference between maximum intensities or minimum intensities based on an average intensity in the aluminum peak.

4. The cathode active material for a lithium secondary battery according to claim 1, wherein the first coating part contains an excess amount of aluminum compared to boron, and the second coating part contains an excess amount of boron compared to aluminum.

5. The cathode active material for a lithium secondary battery according to claim 1, wherein the intermediate part has a tendency that a content of aluminum is decreased and a content of boron is increased from the first coating part side to the second coating part side.

6. The cathode active material for a lithium secondary battery according to claim 1, wherein the first coating part comprises an amorphous aluminum-containing oxide.

7. The cathode active material for a lithium secondary battery according to claim 1, wherein the first coating part comprises at least one of amorphous Al$_2$O$_3$, lithium-aluminum oxide, AlOOH, and Al(OH)$_3$.

8. The cathode active material for a lithium secondary battery according to claim 1, wherein the second coating part comprises an amorphous boron-containing oxide.

9. The cathode active material for a lithium secondary battery according to claim 1, wherein the second coating part comprises at least one of amorphous lithium-boron oxide, LiBO, Li$_2$BO$_2$, Li$_2$B$_4$O$_7$ and Li$_4$BO$_3$.

10. The cathode active material for a lithium secondary battery according to claim 1, wherein the lithium composite oxide contains nickel, and a molar fraction of nickel in the lithium composite oxide among the elements except for lithium and oxygen is 0.7 or more.

11. The cathode active material for a lithium secondary battery according to claim 1, wherein the lithium composite oxide is represented by Formula 1 below:

$$Li_\alpha Ni_y M_z O_{2-\beta}$$ [Formula 1]

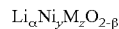

wherein in Formula 1, M is at least one selected from the group consisting of Al, Ti, W, B, F, P, Mg, Mn, Co, V, Cu, Zr, Nb, Mo, Sr, and S, and α, β, y, and z are in a range of 0.7≤α≥1.1, −0.1≤β≤0.5, 0.7≤y≤0.95, and 0.95<y+z≤1.1, respectively.

12. A lithium secondary battery comprising:
an electrode cell which comprises a cathode including the cathode active material for a lithium secondary battery according to claim 1, an anode, and a separation membrane interposed between the cathode and the anode;
a case configured to house the electrode cell; and
an electrolyte in which the electrode cell is impregnated in the case.

13. The secondary battery according to claim 12, wherein the first coating part comprises AlF$_3$.

* * * * *